UNITED STATES PATENT OFFICE.

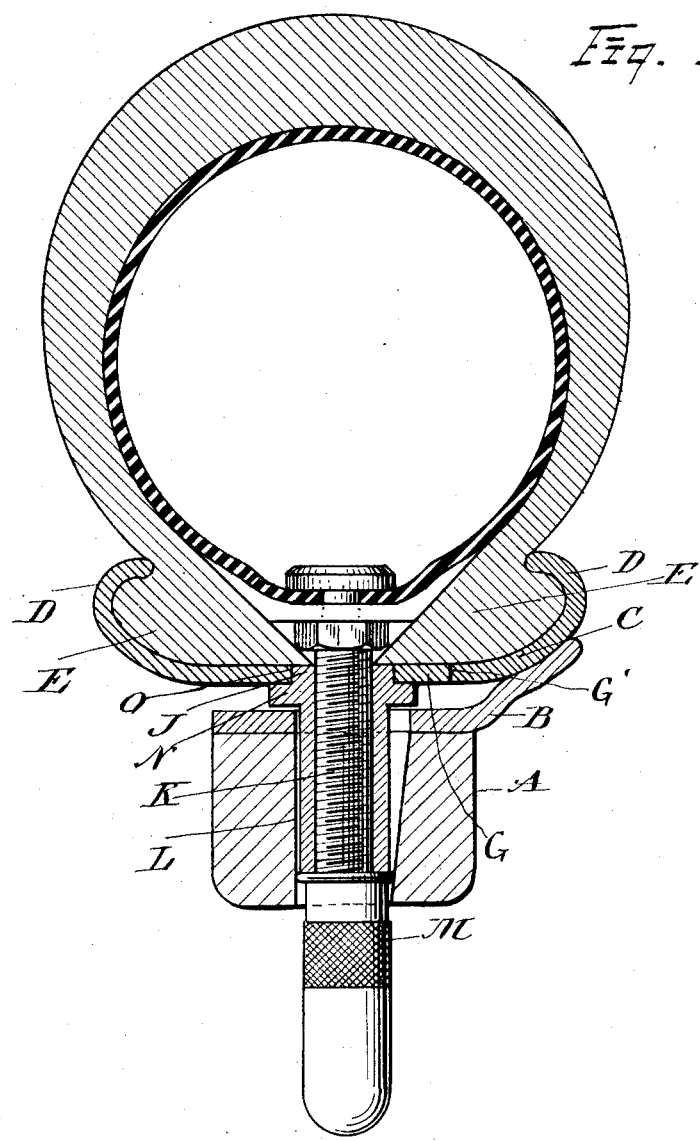

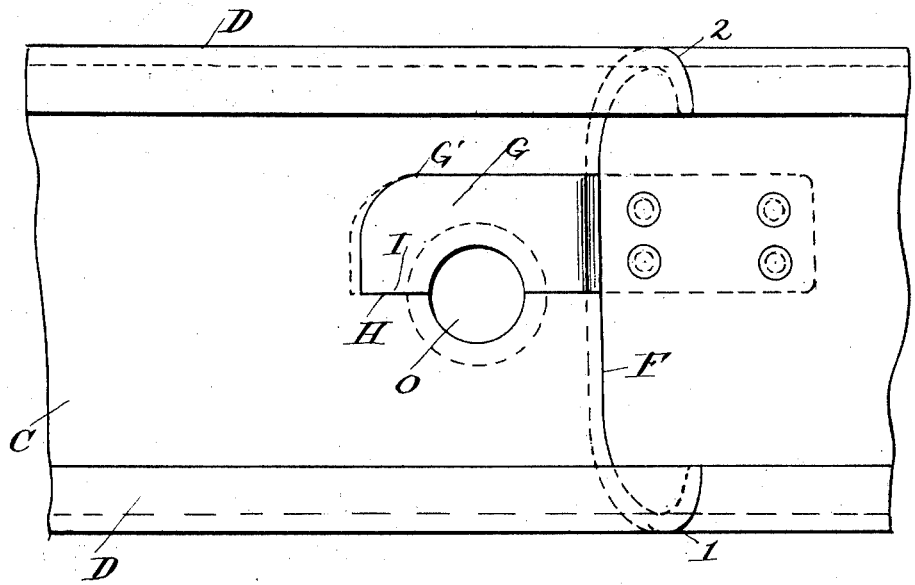
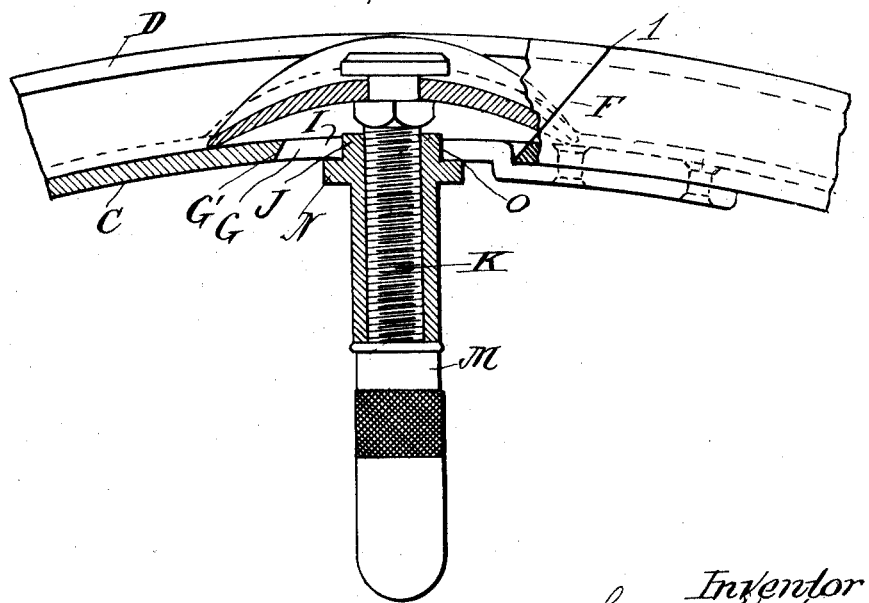

FREDELLIA H. MOYER, OF JOHNSTOWN, PENNSYLVANIA.

DEMOUNTABLE RIM.

1,401,430.   Specification of Letters Patent.   Patented Dec. 27, 1921.

Application filed January 10, 1916, Serial No. 71,160. Renewed April 29, 1921. Serial No. 465,501.

*To all whom it may concern:*

Be it known that I, FREDELLIA H. MOYER, a citizen of the United States, and resident of Johnstown, in the county of Cambria and State of Pennsylvania, have invented certain new and useful Improvements in Demountable Rims, of which I hereby declare the following to be a full, clear, and exact description, such as will enable others skilled in the art to which it appertains to make and use the same.

The objects of the invention are to provide an improved form of detachable rim for the pneumatic tire of an automobile wheel and a rim which can be demountably secured by bolted on wedges or other wedging means to the felly band of the wheel and which can be carried in the machine as a unit without deflation as an extra tire and rim until its use on the wheel is required.

The invention includes a spring rim or tire base transversely split at a single point in its periphery and provided with preferably integral interlocking members at its ends, and upon the same plane, and formed preferably from the sheet metal substance of the rim, which prevent lateral distortion when the inflated tire is mounted thereon.

It also includes retaining or locking means for the longitudinal opposed edges of the interlocking members and if desired located upon or near the circumferential center line of the rim.

By means of the interlocking means referred to it is impossible to separate the rim extremities in a circumferential direction while they remain within the same plane.

The invention includes means for detachably securing the locking member in place to prevent accidental separation of the rim ends. One form includes a locking member which does not continuously or positively connect the rim ends together, but prevents their separation in a circumferential direction while the integral interlocking portions of the rim ends prevent lateral movement of the parts while they continue in the same plane and as long as the rim is expanded. Another form does so interlock the extremities of the rim.

The invention is adapted to be used with the bolted on type of rim or other types if desired, the demountable feature not being included in this invention.

The character of the improved rim however fits it for use with any sort of tire and particularly with tires having non-stretchable beads, since the rim can be readily collapsed to remove the tire and also the ends are positively prevented from circumferential expansion when the rim is attached to the felly band and subjected to the expanding action of the wedging devices ordinarily employed in securing this type of rim upon the felly band.

The invention further includes the combination and arrangement of parts and construction of details hereinafter described, shown in the accompanying drawings and specifically pointed out in the claims.

In the drawings Figure 1 is a transverse section of the rim, the tire and felly and felly band; Fig. 2 is a plan of the rim at the cut showing one form of configuration therefor; Fig. 3 is a circumferential section upon the center line of the rim through the valve stem.

In these views A is the felly of the wheel, B is the felly band, C is the tire holding or base rim provided preferably with integral flanges D between which the edges E of the tire casing are secured.

The rim is cut transversely across by means of a single cut at F, thus forming an integral spring rim with its meeting ends normally in contact with each other or only slightly separated.

The line of the cut is inclined to the radius of the wheel and the points 1 and 2 where it enters and leaves the rim are preferably directly opposite to each other. Intermediate of the edges D, D, of the rim a tongue G is formed in one extremity and a complementary recess G' in the other portion.

The tongue projects circumferentially from one extremity and one circumferential edge H of the recess and its corresponding edge I of the tongue preferably extend circumferentially of the rim and are preferably in close contact with each other.

The interlocking tongue and recess effectually prevent lateral displacement of the rim ends and maintain them in perfect alinement with each other, but the extremities can readily be separated in a radial direction to collapse the rim and permit a tire to be mounted thereon or withdrawn therefrom when desired, and since the split is formed at an angle to the radius of the wheel there will be some clearance between the ends after they are separated and the depressed end can be moved laterally in a helical manner which reduces the bearing surface of the circumference of the rim with little effort, so that the tire can be easily withdrawn therefrom or put in place in the rim.

To prevent separation of the rim ends when the rim is expanded by the wedging devices employed to secure the rim upon the felly band, a locking device is employed. In Figs. 1, 2, and 3 an opening O is formed at the line of division between one side of the tongue H and the recess I, one half of the opening being formed in one rim end and the other in the tongue G and into this opening is inserted the locking pin J which while not positively connecting the parts in a continuous manner, interposes its body to absolutely prevent the tongue from being drawn out of the recess and the rim ends from being drawn circumferentially apart.

This locking pin may be constructed in the manner of a sleeve inclosing the valve stem K and extends into the opening L in the felly band and felly of the wheel.

It is secured in place by the screw cap M of the valve stem and is put in place in the felly and withdrawn therefrom with the rim.

A shoulder N may be formed upon the pin upon which the extremities of the rim rest and which serves as a spacer to elevate the rim from the felly band.

When connected in this manner the sleeve or pin serves as a driver to propel the rim with the wheel.

A securing lever W underneath the recessed end overlaps the split and prevents separation of the parts inwardly while the inclined edges of the split prevent outward displacement of the ends.

This structure is simple, practical, and efficient.

Having described the invention what I claim as new and desire to secure by Letters Patent is:

1. A device of the character described, comprising, an integral rim or tire base, split transversely at a single point and at an angle to the radius of the wheel, a tongue projecting circumferentially from one extremity, the oppposed extremity provided with a corresponding recess, and a separate locking device inserted in the circumferential edges of said tongue and recess, and means in said device preventing radial separation of the said rim extremities.

2. A device of the character described, comprising an integral rim or tire base, said base split transversely in a single plane taken at an angle to the radius of the wheel, a tongue projecting circumferentially from one extremity, the opposed extremity provided with a corresponding recess, and a locking pin inserted between the adjacent circumferential edges of said tongue and recess.

3. A device of the character described, comprising a felly band, an integral rim or tire base sleeved thereon, said base split transversely in a single plane taken at an angle to the radius of the wheel, a tongue projecting circumferentially from one extremity, the opposed extremity provided with a corresponding recess, and a locking pin inserted between the adjacent circumferential edges of said tongue and recess and said pin provided with a shoulder serving as a spacer between said tire base and felly band.

4. A device of the character described, comprising a felly band, an integral rim or tire base sleeved thereon, said base split transversely in a single plane taken at an angle to the radius of the wheel, a tongue projecting circumferentially from one extremity, the opposed extremity provided with a corresponding recess, and a locking pin inserted between the adjacent circumferential edges of said tongue and recess and said pin provided with a shoulder serving as a spacer between said tire base and felly band, said pin having operative engagement with said felly band and serving as a driving and spacing means for said rim.

5. A device of the character described, comprising a felly band, an integral rim or tire base, said base split transversely in a single plane inclined to the radius of the wheel, a tongue projecting circumferentially from one extremity, the opposed extremity provided with a corresponding recess, and a valve stem and cap in said tire base, said stem and cap inserted between the adjacent circumferential edges of said tongue and recess.

6. A device of the character described comprising a felly band, an integral rim or tire base, said base split transversely in a single plane inclined to the radius of the wheel, a tongue projecting circumferentially from one extremity, the opposed extremity provided with a corresponding recess, the meeting longitudinal edges of said tongue and recess provided with a common opening and a combined driving and spacing device in said felly band passing through said common opening.

In testimony whereof, I hereunto set my hand this 3rd day of January, 1916.

FREDELLIA H. MOYER.

In presence of—
RALPH W. JEREMIAH.
WM. M. MONROE.